(12) United States Patent
Chandler

(10) Patent No.: US 6,385,920 B1
(45) Date of Patent: May 14, 2002

(54) MODULAR STORM SHELTER WITH EMERGENCY BREAKAWAY ACCESS CHUTE

(76) Inventor: Roy T. Chandler, 7509 Irongate Ln., Hixon, TN (US) 37343

(*) Notice: Subject to any disclaimer, the term of this patent is extended or adjusted under 35 U.S.C. 154(b) by 0 days.

(21) Appl. No.: 09/608,751

(22) Filed: Jun. 30, 2000

(51) Int. Cl.$^7$ .............................................. E02D 29/00
(52) U.S. Cl. .................................................... 52/169.6
(58) Field of Search ............................ 52/169.6, 169.7, 52/98

(56) References Cited

U.S. PATENT DOCUMENTS

| | | | | |
|---|---|---|---|---|
| 2,871,802 A | * | 2/1959 | Fishler ................. | 52/169.6 X |
| 2,968,130 A | * | 1/1961 | Bascom ................ | 52/169.6 X |
| 3,138,124 A | * | 6/1964 | Baier ..................... | 52/169.6 X |
| 3,159,117 A | * | 12/1964 | Rosenfeld .............. | 52/169.5 X |
| 3,173,387 A | * | 3/1965 | Cree, Jr. ................. | 52/169.5 X |
| 4,250,671 A | * | 2/1981 | Hirsch et al. ........... | 52/167.3 |
| 4,642,952 A | * | 2/1987 | Prandin .................. | 52/169.6 |
| 4,660,334 A | * | 4/1987 | McCarthy .............. | 52/169.6 |
| 4,805,360 A | * | 2/1989 | Kuehnl ................... | 52/169.1 |
| 5,115,613 A | * | 5/1992 | McCarthy ............... | 542/169.6 |
| 5,749,181 A | * | 5/1998 | Bauman .................. | 52/169.6 |

OTHER PUBLICATIONS

U.S. application No. 02/729,966, Lutteke, filed Jan. 1956.*

* cited by examiner

Primary Examiner—Beth A. Stephan
Assistant Examiner—Brian E. Glessner
(74) Attorney, Agent, or Firm—Donn K. Harms

(57) ABSTRACT

An emergency storm shelter providing save haven for occupants during tornados and windstorms. The shelter features an elongated cylinder with sealed ends forming a center cavity for occupants during a storm. Emergency access is provided by at least one access tube formed having an interior passage therethrough communicating with the interior passage of the cylinder. The access tube is of a length to extend above the surface of the ground in which the elongated cylinder is buried, and can also be made long enough to communicate through the walls or floor of an adjacent house or mobile home to allow occupants to enter the storm shelter quickly and without leaving the safety of their home interior during high winds and tornados. In the best mode the access tube communicates between the living area of the home and the center cavity of the elongated cylinder at an angle such that the interior wall surface of the access tube forms a slide to allow users to quickly enter the shelter during an emergency. Ladder rungs in the one access tube or a secondary access tube provide for exit from the shelter when safety dictates it prudent to exit. An optional anchor device helps secure the shelter underground in high water table areas.

16 Claims, 3 Drawing Sheets

MODULAR STORM SHELTER WITH EMERGENCY BREAKAWAY ACCESS CHUTE

BACKGROUND OF THE INVENTION

1. Field of the Invention

The present invention relates to an underground storm shelter. More particularly it relates to modular storm cellar providing sanctuary to occupants during the deadly high winds encountered during tornados and hurricanes. The disclosed device is especially useful in providing emergency refuge to occupants of mobile homes or trailers which are especially susceptible to the high winds and high speed projectiles encountered during tornados. Dual access ports on preferred embodiments provide additional utility by providing both instant access during the short warning period prior to a tornado, as well as an emergency exit should the mobile home collapse on its piers and block the communicating trap door access once the storm has cleared.

2. Prior Art

Damage and loss of life in the United States from tornados and the winds associated with hurricanes is staggering. As an example, in 1987 there were 656 tornados in the United States resulting in the death of 59 citizens. In 1982, one of the worst years on record, there were 1046 tornados, causing an aggregate 64 deaths amongst the population of the United States living in constant fear of the deadly storms which occur in the Mid-West portion of the country. In an average year, no less than 850 tornados strike the Midwest. A major portion of theses deadly and damaging storms strike a stretch of the Midwest known as "Tornado Alley" which, due to geographic factors of the Rocky Mountains and atmospheric interaction of weather over the great plains, stretches from Texas to Wisconsin.

During a tornado and a "super cell" thunderstorm surrounding the tornado for miles around, the winds and hail, and rain, become extremely dangerous to any human or animal life form unfortunate enough to be caught in the path of the storm. Tornados themselves can range from small weak storms with 40 mile an hour winds, to large frustro conic shaped whirlwinds contacting land in a ½ mile wide swatch. Winds at the contact point of a tornado with the ground can easily reach 300 miles per hour, and can last from a few seconds, to several hours, as the storm creates a path of destruction over an entire state.

When such a disaster approaches any populated area, people are typically instructed to seek safe haven from the approaching high winds, and the wind driven projectiles. Such winds and projectiles as large as automobiles or mobile homes can destroy a home and kill any person unlucky enough to encounter the path of destruction and terror that is a tornado. Equally devastating, but with more warning attached, are hurricanes that come into contact with coastal areas of the United States and can generate sustained high winds over 150 miles per hour for hours at a time.

Safe haven in such a terrifying event as a tornado or hurricane is generally a safe zone inside a permanent substantially reinforced structure, or optimally, a basement encased below the structure and below ground level. In the event that a basement is not available, a center section of the structure surrounded by as many walls, and as much of the structure itself is preferable to help stop the wind and more importantly the wind driven projectiles from injuring or killing the structure occupants. Projectiles can have the effect of a small ballistic missile when accelerated by high velocity storm winds.

In many historically tornado prone areas in the Midwest, storm cellars under the home or below ground adjacent to the home have been a common inclusion into housing for decades. In recent years, manufacture housing, which is factory built and moved to a pre-poured slab foundation, has caused a large portion of new permanent housing to be built without any underground shelters for the occupants. Also in recent years, the popularity of mobile homes and trailers have evolved to become a huge provider of housing to citizens of the Midwest. Such homes come in styles that appear as trailers to homes which look essentially like frame and brick structures.

The vast majority of mobile homes and trailers are typically parked on a small cement slab and secured on piers to maintain the mobile home in a level platform for long term use. Unfortunately, such a minimal securement to the ground, and the thin walls of mobile housing, combine to yield an extremely dangerous combination during tornados and hurricanes. Projectiles driven by high wind velocity can easily pierce one or even multiple walls of mobile housing becoming deadly to any occupants still inside.

Since most such mobile housing essentially rests on top of ground supported piers by the simple force of gravity, there is a propensity of mobile housing to be highly prone to roll over in high winds. It is not uncommon for mobile homes to be picked up by a tornado and deposited yards or miles away in a heap. Further wind driven trees, branches, boards, glass, and other projectiles piercing the walls of such housing render them virtually useless for protection against a tornado and in many cases the lower speed winds of a hurricane.

But because of the very nature of mobile housing being mobile, and having a floor and floor mounted interior structure that is supposed to be mobile, secure mounting, basements, and attached storm cellars, are almost always precluded from attachment to the mobile home or trailer. Consequently, a tornado approaching with normal little or no warning, can easily catch the occupants of the mobile home by surprise resulting in death or injury when the occupants have no storm shelter within easy access. There thus exists a need for an easily manufactured and installed shelter from the high winds and projectiles generated by tornados and hurricanes.

In recent years some prefabricated units have been designed and sold, but these are generally designed to be buried adjacent to, or under, a permanent structure style home. Usually such units provide a single access door which communicates between ground level and the cavity inside the unit. They require a significant investment in excavation and are prone to trapping occupants should the overhead structure collapse on the shelter.

The device as herein disclosed is a significant improvement in the provision of storm cellars in that it can be installed after the main structure has been built. It is modular in nature and can thus be initially constructed as a small shelter and later added onto to increase the size if needed. Further, the disclosed device provides a significant increase in the safety of occupants of mobile housing such as mobile homes and trailers because it can be installed adjacent to the poured concrete slab conventionally used for mounting of mobile housing. This is accomplished by providing an emergency trap door shoot for occupants of mobile housing to quickly enter the emergency shelter, as well as a second access port to provide outside access as well as an exit in the event that the trailer is turned over or collapses on the emergency entrance. A break away extension tube from the first access port provides communication to the interior of the shelter while affording protection to the occupants of the shelter in the event that the mobile home is sheared from its piers from the high winds.

U.S. Pat. No. 4,955,166 (Qualline) addresses the issue of an underground shelter that can be built and then buried. However, Qualline addresses, primarily, the issue of water proofing, lacks an emergency chute, and requires extensive excavation to mount.

U.S. Pat. No. 4,534,144 (Gustafsson) teaches an underground bomb shelter and storage unit, however, it provides no easy access to users and only one entry and exit port.

U.S. Pat. 5,749,181 (Bauman) teaches a trench mounted tubular emergency shelter, however, Bauman fails to offer an emergency access port required when users have only a moments notice of impending disaster and fails to teach dual access ports to allow occupants to exit from a second port in the event of a collapse on top of the single access.

As such, there exists a need for an easily and inexpensively manufactured storm shelter which can be easily mounted by a user especially occupants of mobile housing that is especially prone to extreme damage from tornados and hurricanes. Such a device should feature an emergency chute for almost instantaneous access to the shelter from the mobile home. Such a device should also feature a plurality of entrances and exits in the highly likely event of a collapse of the mobile home upon one entrance. Such a shelter, when used in combination with mobile housing, should also offer a break away mount communicating between the interior of the shelter and the interior of the mobile home which seals the shelter from the high winds in the event the mobile home is sheared from its moorings.

SUMMARY OF THE INVENTION

Applicant's device is an easily manufactured and installed storm shelter that can be pre manufactured in a number of embodiments to be installed adjacent to a mobile home or conventional housing of wood or other construction. The device in the current best mode would be of an elongated cylindrical shape with hemispherical ends located at each end of the cylinder. The curvature of the elongated cylinder provides exceptional strength against crushing pressure of the surrounding soil as well as potential structures overhead. In areas prone to high water, table anchors could be provided on the exterior of the elongated cylinder section to be attached to cables secured to concrete anchor blocks of a size sufficient to overcome anticipated buoyancy forces or other manner of conventional securement to thereby resist any buoyant forces created by such a combination of soil and water table.

The shelter is formed of fiber reinforced plastic or resin by molding or other conventional process of construction of fiber reinforced structure. Currently, fiberglass reinforced resins which harden to the desired shape of the mold are a common manner to construct such structures. Circumferential reinforcement rings are integrally molded into the cylindrical body to provide additional strength to the cylindrical body portion of the shelter during the manufacturing process.

The shelter device can be manufactured in a number of different sizes to accommodate increasing numbers of occupants during a storm. Of the several embodiments herein disclosed, multiple occupant embodiments would normally be installed horizontally parallel to the center axis of the elongated cylindrical body portion. The single user embodiment would be installed with the center axis of the elongated cylindrical body vertically disposed in a position essentially normal to the plane of the above ground surface.

The cylindrical body will typically be mounted in a properly excavated trench and buried with the top portion of the cylindrical body portion closet to the ground surface, being about two feet below ground level when mounted. The multiple occupant embodiments of the device will feature two access tubes communicating with the interior of the cylindrical body in a sealed relationship at an attachment end, and extending approximately 12 inches above ground level at an entry end opposite the attachment end. The interior of the access tube would be of a diameter sufficient to accommodate anticipated users, generally about 32 inches. The access tubes would be oriented vertical or inclined in relation to the center axis of the cylindrical body portion of the shelter at an angle for best ingress of substantially 45 degrees to the center axis, however, other angles of incline may be used depending on the area available for the device to be mounted and the speed desired for the person entering.

In the one man embodiment of the shelter device a single access tube would be provided which communicates with the interior cavity of the cylindrical body portion at one end and above the ground surface at the distal end. The single access tube would be mounted in the same manner as the double access tubes of the multiple occupant embodiment.

All such access tubes will have a hinged lid covering the entry end. The lid will allow for easy ingress and exit to the shelter device by a simple lifting of the lid to allow users access to the communicating cavity in the cylindrical body portion of the device. The lid in the current best mode features a vent to allow venting of the atmosphere inside the cavity of the cylindrical body with a screen mesh to block access thereto by insects and animals.

Depending on the angle of orientation of the access tube to the center axis of the cylindrical body, the access tubes will feature ladder rungs on the steeper angles and would be configured as an emergency slide on the more obtuse angles such as the 45 degree angle embodiment. To provide for fast entry and double exit from the cavity of the cylindrical body, a first access tube featuring an interior wall surface formed as a slide would provide exceptionally speedy access to the shelter during an emergency. The second access tube would be mounted at an angle substantially normal to the center axis of the cylindrical body and have ladder rungs mounted on the interior wall surface for ingress and egress therethrough.

The solo model for one person might also feature an access tube with a slide or with ladder rungs or both. In the case of the slide, a rope or recessed rungs might also be mounted in the access tube to provide the occupant a manner in which to climb back out of the first access tube.

In the event that water enters the shelter, sufficient sump areas are provided which communicate with the interior cavity of the elongated cylinder to provide drainage.

In the current best mode of the device for use with mobile housing or in some cases through the wall or floor of permanent housing, a break away defined separation point would be placed at the top end of the first access tube using a collared fitting designed to break away or by perforating the tube itself at a designated point to allow a break away of the upper portion during a storm. The defined separation point would be attached to the entry end of the first access tube and would break away from the access tube in the event that the attached home collapses or is sheared from its moorings on the ground. If the separation point is defined by a separation collar it would be especially well suited for attachment to the floor or lower wall surface of mobile housing by providing the ability to allow the collar to break away and not damage the communicating access tube or the shelter itself while allowing the occupant almost instantaneous access to the shelter through a wall or floor surface during an emergency. A second sealing lid would be provided for below the defined separation point in the access tube to allow the users to seal the access tube in case shear forces cause the upper portion of the access tube and lid break to break away. Occupants of mobile housing who are especially endangered by sudden tornados or high windstorms, would thus have immediate access to shelter through a wall or floor surface of the home and would be spared exposure to the high winds seeking other forms of storm shelter that may or may not be provided in trailer parks.

An object of this invention is to provide a prefabricated storm shelter that is easily located adjacent to a home or mobile home providing shelter during dangerous storms.

Another object of this invention is to provide a storm shelter that is easily accessed in the short warning time prior to dangerous storms and easy to exit when the storm passes.

A further object of this invention is the provision an entry point to the shelter that can be communicated through the wall or floors of mobile housing and provide instant access to shelter and break away from the shelter without damaging it should the mobile home be destroyed or sheared from its moorings.

An additional object of this invention is the provision of a design for various sized shelters that can be easily manufactured and installed adjacent to already built homes or newly constructed homes.

A still further object of this invention is the provision of a defined point of separation of the upper portion of the access tube to allow it to be attached to dwellings that might be subject to shear during a storm.

Further objects of the invention will be brought out in the following part of the specification, wherein detailed description is for the purpose of fully disclosing the invention without placing limitations thereon.

BRIEF DESCRIPTION OF DRAWING FIGURES

DETAILED DESCRIPTION OF THE PREFERRED EMBODIMENTS OF THE INVENTION

Figure 1:
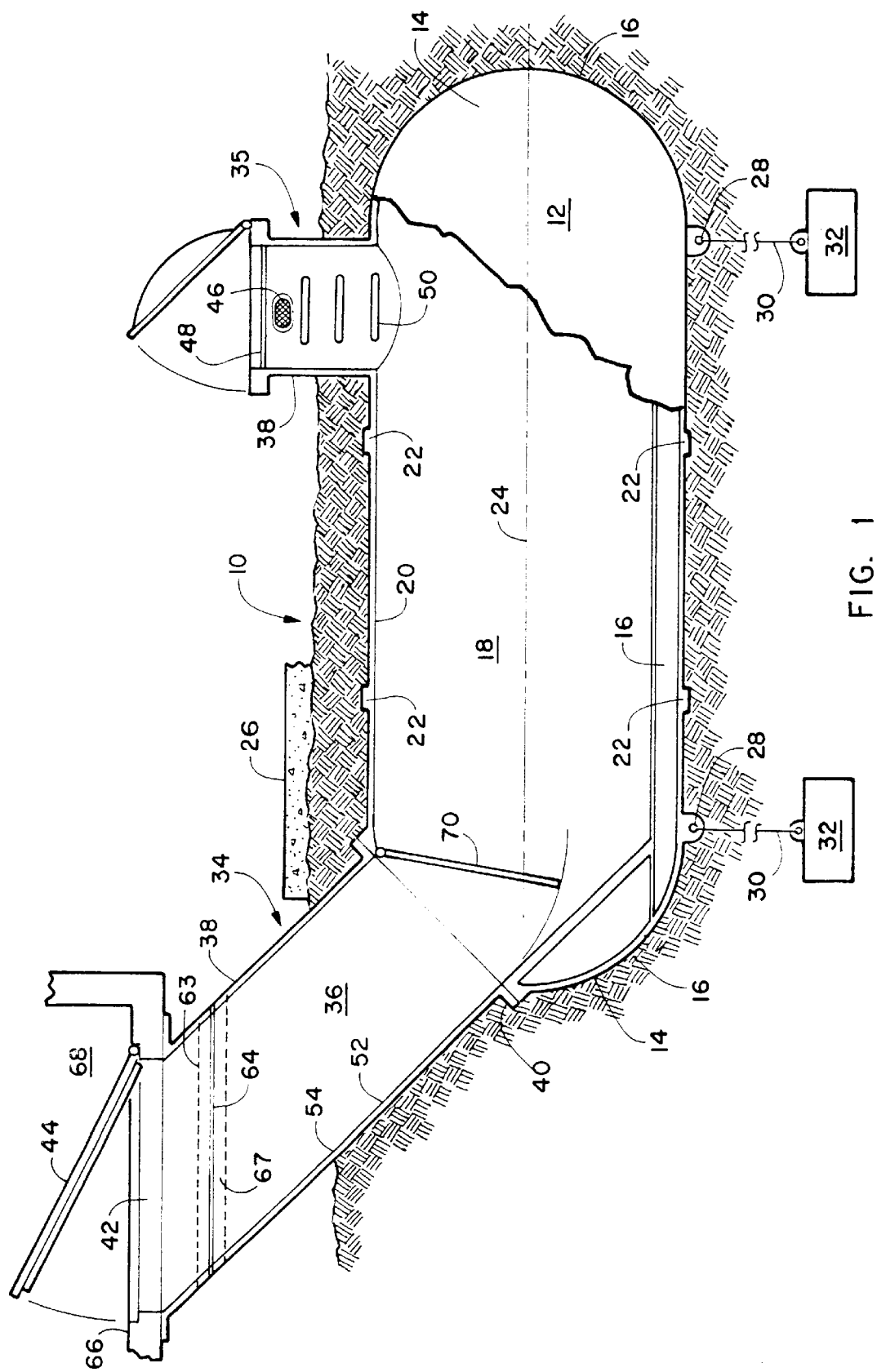
FIG. 1 is a side cut away view of a preferred embodiment of the storm shelter device showing two access ports to the interior cavity living area.
Figure 2:
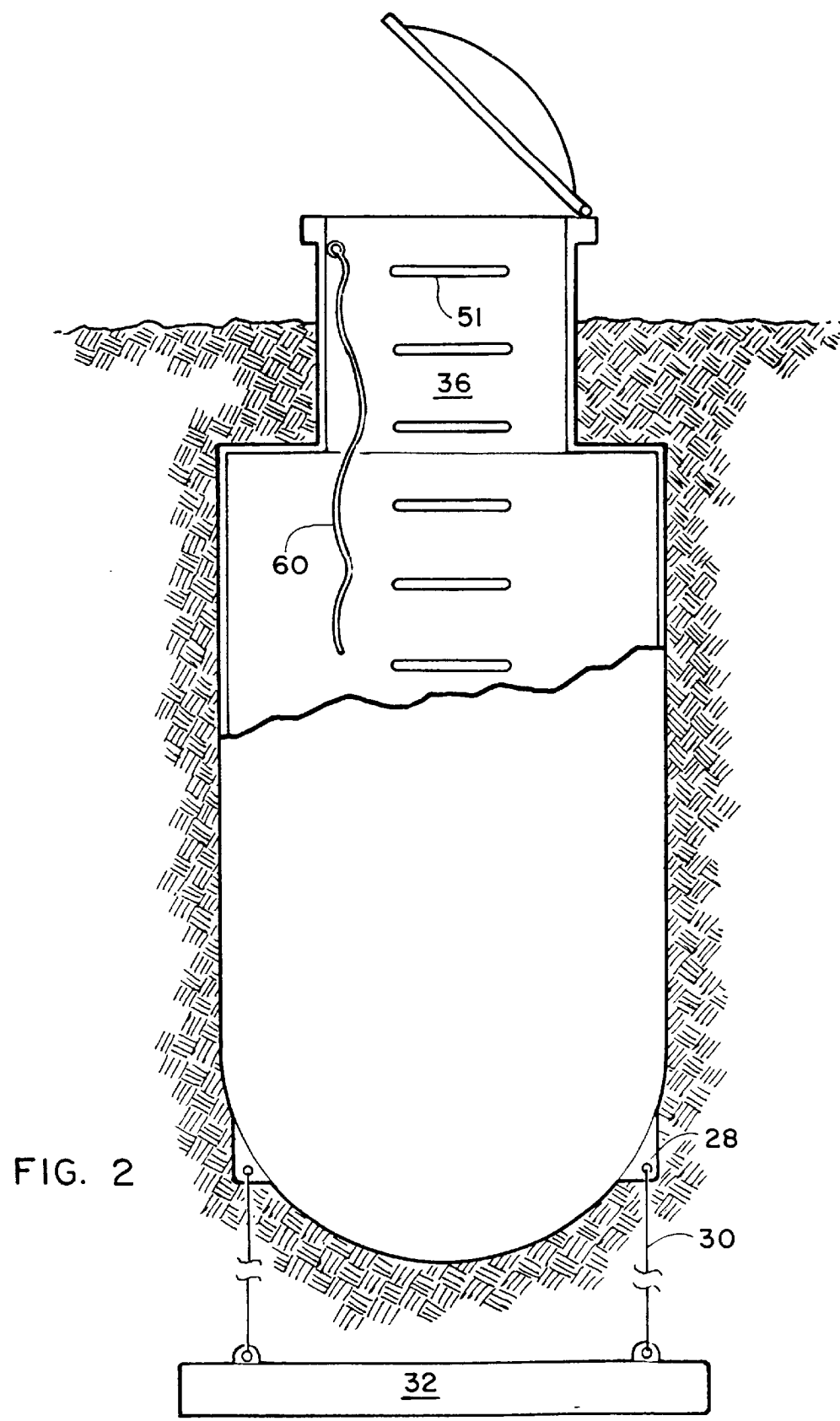
FIG. 2 is a side cut away view of the storm shelter device for use by a single person.
Figure 3:
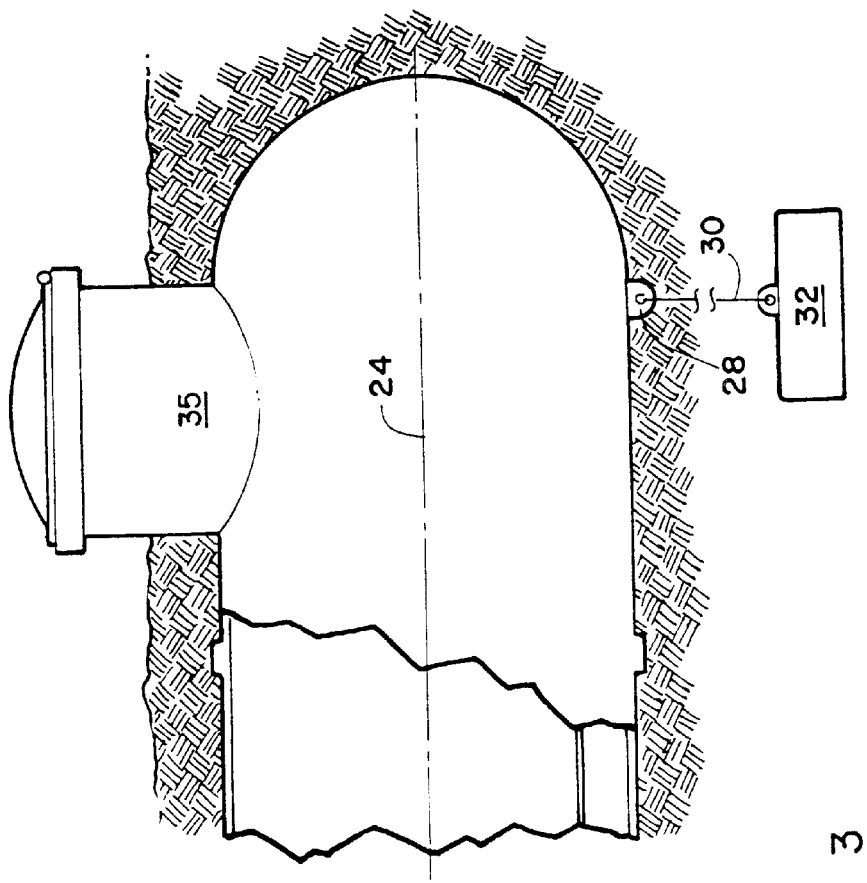
FIG. 3 is a side cut away view of the storm shelter device depicting a second embodiment of the device with a pair of staired access ports.
Figure 3:
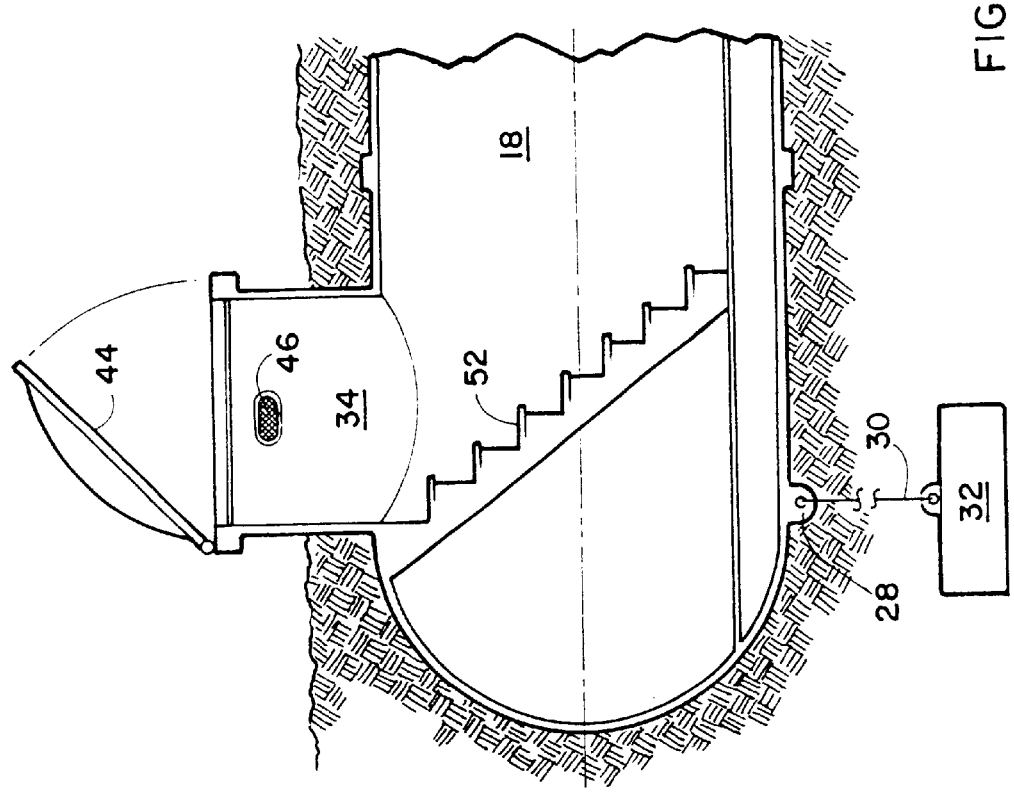

Referring now to the drawing figures, specifically FIGS. 1 through 3 depict preferred embodiments of the storm shelter device 10 herein disclosed and the construction and operation thereof. The disclosed storm shelter device 10 is easily manufactured using conventional fiber reinforced resin or plastic manufacturing techniques. The storm shelter device 10 can be pre manufactured in a number of embodiments to be installed adjacent to a mobile home or conventional housing of wood or other construction.

In the current best mode, the storm shelter device 10 is constructed to feature an elongated cylinder 12 with two hemispherical shaped endcaps 14 located at each of the two ends 16 in a sealed relationship with the cylinder 12 thereby forming an interior cavity 18 inside the cylinder 12. The curved wall surface 20, elongated cylinder 12 and the hemispherical shaped ends 14 provides exceptional strength against exterior pressure from the soil or structures above in the current best mode of the device, however, it could be made from flat or square shaped walls and still yield a substantial improvement over current conventional shelter devices.

The shelter device 10 in the current best mode is formed of fiber reinforced plastic by molding or other conventional process of construction of fiber reinforced structure. Steel or aluminum might also be welded to yield the same shape structure 10, however, such materials are heavy and prone to corrosion and more expensive so the fiber reinforced plastic would be the current preferred materials.

For additional strength in the cylinder wall 20 of the elongated cylinder 12, circumferential reinforcement rings 22 may be integrally molded into or attached to the exterior surface of cylinder wall 20 of the elongated cylinder 12 body to provide additional strength thereto.

The storm shelter device 10 will typically be mounted in a properly excavated trench adjacent to the existing concrete slab provided for mobile homes and buried with the center axis 24 of the elongated cylinder 12 substantially level and parallel to the level surface of the concrete slab 26 forming the conventional foundation of a trailer or mobile home or to the floor 66 if there is no slab 26. The portion of the cylinder wall 20 closest to the surface of the ground being about two feet below ground level when finally mounted in the trench and buried. In areas prone to high water tables which would tend to make the buoyant shelter device 10 rise, at least one anchor fastener 28 could be provided on the exterior of the elongated cylinder 12 section. The anchor fastener 28 would then be attached to cables 30 secured and communicating with concrete anchor blocks 32 of a size and sufficient weight to overcome anticipated buoyancy forces of the sealed storm shelter device 10 and thereby preventing rising. Of course, other manner of conventional securement to resist any buoyancy created by such a combination of soil and water table on the shelter device 10 might also be used but the cables 30 attached to anchor blocks 32 is the current best mode for ease of installation in a variety of soil conditions.

The shelter device 10 can be manufactured in a number of different sizes dimensioned to accommodate increasing numbers of occupants during a storm. The multiple occupant embodiment depicted in FIG. 1 in commercial use would be installed horizontally with the center axis 24 traversing the center interior cavity 18 of the elongated cylinder 12 body portion and being substantially level. The single user embodiment depicted in FIG. 3 would be capable of placement in areas with minimal available ground adjacent to the structure occupied by the user and due to a mounting featuring the center axis 24 of the elongated cylinder 12 body and interior cavity 18 vertically disposed in a position essentially normal to level ground above.

The shelter device 10 features at least one inclined access tube 34 and in the best mode features a plurality of access tubes shown as inclined access tube 34 secondary access tube 35. Each access tube 34 and 35 has an interior passage 36 defined by the access tube wall 38, and the interior passage 36 communicates with the interior cavity 18 of the elongated cylinder 12 forming the living area, in a sealed relationship at an attachment end 40 and 41. The inclined access tube 34 extends upward from the attachment end 40 where it is in sealed communication with the interior cavity 18 to a point where the entry end 42 is approximately twelve inches above ground level and opposite the attachment end 40. The interior passage 36 of the inclined access tube 34 should be of a diameter sufficient to accommodate anticipated users during a hurried entry, generally about thirty-two inches however this may vary according to the intended users or situation.

The inclined access tube 34 is oriented upward from the center axis 24 of the elongated cylinder 12 forming the interior cavity 18 of the shelter 10 at an angle to allow for a sliding ingress into the interior cavity 18 which in the current best mode is between ten and forty-five degrees from the center axis 24 depending on the mode of entering and leaving the individual access tube, with the current best angle substantially forty-five degrees. The secondary access tube 35 is pictured perpendicular to the center access 24 and would thus allow controlled entry thereto using ladder rungs 50 for a slower entry into the communicating interior cavity 18, however it could be angled as needed to allow quick access.

As indicated above, in the current best mode for the multiple person embodiment, two access tubes, in the form of inclined access tube 34 and secondary access tube 35 are used. While a single access tube such as inclined access tube 34 might also be used in certain instances due to installation considerations, and provide for emergency access into the center cavity 18, the plurality of access tubes 34 and 35 provide for dual entry and exit points to the shelter 10 in the event that one of the access tubes 34 or 35 becomes blocked. In the one man embodiment of the shelter device a single inclined access tube 34 is depicted due to space considerations and vertical disposition of the center axis 24. This single inclined access 34 would be mounted in the same manner as the double access embodiments, but the device would still afford much more protection to mobile home occupants through the passageway to the shelter provided by the interior passage 36 of the single inclined access tube 34 which would communicate through the wall or floor of the mobile home or conventional frame home and allow quick access thereto. By allowing occupants of the home to literally jump into the shelter device, speed is greatly increased in an emergency. Further, the need to run outside, where high speed projectiles are certainly lurking and which can maim or kill a person, is eliminated by making the inclined access tube 34 of a length sufficient to communicate through the wall or floor of a home or mobile home or trailer and allow entry into the shelter from inside the home. In the one man embodiment the inclined access tube 34 is depicted as substantially parallel with the inclined center axis, however, it could be angled as in figure one to yield a sliding access into the communicating interior cavity 18 depending on the amount of ground available for placement of the device. If the inclined access tube 34 is substantially upright then ladder rungs 50 would be used for ingress into the interior cavity 18 and conversely if angled as depicted in FIG. 1 then the user would slide into the interior cavity 18 and exit using ladder rungs 50 or steps 51 recessed in the surface of the inclined access tube 34 or secondary tube 35 as depicted.

The inclined access tube 34 in the best mode features a means for closure of the entry end 42 such as a hinged lid 44 covering the entry end 42 which may be lifted by the user to gain access thereto. The hinged lid 42 will thus allow for each ingress into and exit from the shelter device 10 by a simple lifting of the lid 44 to allow users access through the interior passage 36 and into the interior cavity 18 in the of the elongated cylinder 12 of the device 10.

In the current best mode, the device 10 also features a vent 46 to allow venting of the atmosphere inside the interior cavity 18 to keep humidity or other unwanted components of the atmosphere to a minimum. A screen mesh 48 would be placed in the vent 46 to block access thereto by incests and animals. While the device 10 would function without the vent 46, the use of the vent 46 is preferable to allow the atmosphere to remain neutral to the outside air in humidity. As depicted in FIG. 2, the vent 46 is placed at the entry end of secondary access tube 35, however, those skilled in the art could substitute a vent pipe or similar conventional configuration that would communicate with the interior cavity 18 for ventilation and such is anticipated.

Depending on the angle of orientation of the access tubes 34 and 35 to the center axis 24 of the elongated cylinder 12, the access tubes 34 and 35 will feature ladder rungs 50 or recessed steps 51 formed on the interior surface of the access tubes 34 and 35 when at steeper angles and thereby provide a means for ingress to the center cavity 18 and also provide a means egress from the center cavity 18 through the access tubes 34 and 35. On the inclined access tube 34 which has a more obtuse angle in relation to the center axis 24, the means of ingress to the center cavity 18 would be provided by a slide 52 provided by the interior wall surface 54 of the inclined access tube 34. To provide for fast entry and double exit from the interior cavity 18 of the elongated cylinder 12, in the current best embodiment the inclined access tube 34 featuring an interior wall surface forming a slide 52 would provide emergency access into the center cavity 18 in seconds and on short notice from the interior of the dwelling. The secondary access tube 35 would be mounted at an angle substantially normal to the center axis 24 and have ladder rungs 50 mounted on or formed into the interior wall surface of the secondary access tube 35 for ingress and egress there through. In certain instances where the ability to walk into or out of the device 10 is deemed desirable, a staircase 53 as depicted in FIG. 3, can be formed into one or both access ports in the casting of the device 10 and thus provide a stairway into the cavity interior. As is obvious, the device 10 can be manufactured for use with one or a combination of ladder rungs 50, staircase 53, or a slide 52 provided for access with the slide 52 being the best mode for fast emergency access.

The solo model for one person might also feature an access tube with a slide 52 or with ladder rungs 50. In the case of the slide 52, a rope 60 or recessed rungs 50 might also be mounted in the inclined access tube 34 to provide the occupant a manner in which to climb back out.

To capture any water entering the shelter device 10, sufficient sump areas 62 may be provided during manufacture which communicate with the interior cavity 18 to provide drainage of water build up. While the sumps 62 are not necessary for the operation of the shelter device 10 in its main goal of providing protection from high winds, the sumps 62 do provide a much cleaner and more comfortable living area in the interior cavity 18 by venting water therefrom. Of course pumps might be used also to vent water build up but the sumps 62 provided the easiest rectification of water build up.

In use in combination with mobile housing or in some cases through the wall or floor of permanent housing, a means for controlled separation of a defined portion the inclined access tube 34 is provided to allow a determined portion of the inclined access tube 34 adjacent to the entry end 42 to break away in extreme storms. While depicted on the dual access tube embodiment in FIG. 1, the means for controlled separation of a defined portion of the access tube might also be used to enhance the function of the single access tube embodiment of FIG. 2. While the device 10 will function without this means for controlled separation of a determined portion of the access tube 63 and still provide heretofore unobtainable shelter to users, in the current best mode a means for controlled separation adjacent to the upper end of the inclined access tube 34 would be desirable. This means for controlled separation of a defined portion of the access tube 63 in the current best mode is provided by a groove or perforation 64 in the wall surface forming the inclined access tube 34 at a defined position of the inclined access tube 34 below its communication with the wall or floor 66 or into the living area 68 of the adjacent home. This perforation 64 would thus provide a weak spot in the wall of the inclined access tube 34 and a determined breaking or separation point in the inclined access tube 34. Upon encountering sheer forces caused by the collapse or movement of the above ground living structure, a defined portion of the inclined access tube 34 breaks away protecting the structural integrity of the remaining portion of the inclined access tube 34 and the device itself 10. Thus a means of controlled separation of a defined portion of the access tube 34 adjacent to the entry end 42 is provided to further enhance the safety and utility of the device 10. In the event that the attached home collapses or is sheared from its moorings on the ground, the perforation 64 would cause the entry end 42 to break away from the inclined access tube 34 at the predetermined point preventing damage to the remainder of the communicating inclined access tube 34 or the shelter itself while concurrently allowing the user almost instantaneous access to the shelter through a wall or floor 66 surface during an emergency such as the moments prior to a tornado striking. As noted, in the current best mode, the means for controlled separation of a defined portion of the inclined access tube 34 is provided by groove or perforation 64 formed at a determined point into the surface of the inclined access tube 34. However, those skilled in the art could substitute other means to weaken the inclined access tube 34 at a defined sheer point and such as a slip joint fitting 67 which would frictionally engage the exterior of both the entry end 42 and remainder of the access inclined tube 34 which would also allow a defined portion of the access tube at the entry end 42 to break away from sheer forces. As such, other means to weaken the access tube at a defined point are anticipated.

The perforation 64 in the current best mode is formed into the exterior of the inclined access tube 34 at a point between four and twelve inches above the ground surface when the inclined access tube 34 is mounted into the soil attached to the buried cylinder. An optional second sealing lid 70 may be provided at a point in the inclined access tube 34 and hinged adjacent to the perforation 64 in the inclined access tube 34 to allow the users to seal the inclined access tube 34 in case the portion of the access tube 34 above the perforation 64 breaks away. The second sealing lid 70 would best be biased toward a closed position by a spring or other biasing means and positioned in the break away portion of the inclined access tube 34. In this fashion the second sealing lid 70 would automatically close when defined portion of the inclined access tube 34 breaks away due to sheer forces. By providing this means for controlled separation of a defined portion of the inclined access tube 34 in combination with the placement of the entry end of the inclined access tube 34 inside the above ground dwelling, users are thus afforded heretofore unobtainable access to shelter through a wall or floor of a mobile home while, concurrently, damage to the shelter is avoided if the home should collapse or be blown away.

While all of the fundamental characteristics and features of the storm shelter with emergency breakaway access ports herein disclosed have been shown and described, it should be understood that various substitutions, modifications, and variations may be made by those skilled in the art without departing from the spirit or scope of the invention. Consequently, all such modifications and variations are included within the scope of the invention as defined by the following claims.

What is claimed is:

1. An emergency storm shelter comprising:

an elongated cylinder having two ends, said elongated cylinder formed by a cylinder wall, said cylinder wall having an interior wall surface and an exterior wall surface, two ends and a center axis extending therethrough;

a pair of end caps in sealed communication with said two ends of said elongated cylinder;

a center cavity having a center axis therethrough said center cavity defined by the area between said interior wall surface and said two endcaps;

at least one access tube formed of a tube wall, said access tube having an entry end an attachment end, said access tube having an interior passage communicating therethrough defined by the interior surface of said tube wall, the point of communication of said interior passage with said entry end and said attachment end;

said attachment end in sealed communication with said cylinder wall with said interior passage communicating with said center cavity through said cylinder wall;

said access tube adapted to extend above the surface of the ground in which the elongated cylinder is to be buried and into a living area of an adjacent structure;

means for closure of said entry end;

means for ingress from said interior living area of said adjacent structure through said interior passage to said center cavity for intended occupants of said center cavity;

means for egress from said interior cavity for said intended occupants; means for separation of a determined portion of said access tube adjacent to said entry end at a determined shear force acting thereon; and whereby, said emergency storm shelter may be mounted below the surface of the ground, adjacent to said structure having the interior living area for occupants defined by an above ground floor and the walls and roof of said structure, and thereby allow emergency access to said center cavity for said occupants of said interior living area of said structure through said access tube, thereby eliminating the need to exit said structure first.

2. The emergency storm shelter as defined in claim 1 additionally comprising said means for ingress through said interior passage to said interior cavity is provided by said access tube being inclined at an angle from said center axis at an angle wherein said interior surface of said tube wall forms a slide for intended occupants to slide thereon from said entry end to said attachment end and into said interior cavity.

3. The emergency storm shelter as defined in claim 1 additionally comprising said means for ingress through said interior passage to said interior cavity is provided by said access tube being inclined at an angle from said center axis wherein said interior surface of said tube wall forms a slide for intended occupants to slide thereon from said entry end to said attachment end and into said interior cavity.

4. The emergency storm shelter as defined in claim 3 additionally comprising means for separation of a determined portion of said access tube adjacent to said entry end at a determined shear force acting thereon.

5. The emergency storm shelter as defined in claim 1 wherein said means for separation of a determined portion of said access tube at a determined shear force acting thereon, is provided by a groove cut into said tube wall at a determined point between said entry end and said attachment end.

6. The emergency storm shelter as defined in claim 1 wherein said means for closure of said entry end is a lid attached adjacent to said entry end, said lid sized to seal against said tube wall when in a closed position.

7. The emergency storm shelter as defined in claim 1 additionally comprising a secondary access tube having a center passageway communicating through said tube wall to said interior cavity.

8. The emergency storm shelter as defined in claim 1 additionally comprising a secondary access tube having a center passageway communicating through said tube wall to said interior cavity.

9. The emergency storm shelter as defined in claim 1 additionally comprising means for anchoring said emergency storm shelter below ground level.

10. The emergency storm shelter as defined in claim 1 additionally comprising means for anchoring said emergency storm shelter below ground level.

11. The emergency storm shelter as defined in claim 9 wherein said means for anchoring said emergency storm shelter below ground level is at least one anchor fastener affixed to said cylinder wall, said fastener communicating with an anchor weight to thereby anchor said emergency storm shelter.

12. The emergency storm shelter as defined in claim 10, wherein said means for anchoring said emergency storm shelter below ground level is at least one anchor fastener affixed to said cylinder wall, said fastener communicating with an anchor weight to thereby anchor said emergency storm shelter.

13. The emergency storm shelter as defined in claim 1 wherein said means for egress are ladder rungs attached to said interior surface of said access tube.

14. The emergency storm shelter as defined in claim 3 wherein said means for egress are ladder rungs attached to said interior surface of said access tube opposite said slide.

15. The emergency storm shelter as defined in claim 7 wherein said secondary access tube has said ladder rungs attached to the wall surface of said center passageway.

16. The emergency storm shelter as defined in claim 8 wherein said secondary access tube has said ladder rungs attached to the wall surface of said center passageway.

* * * * *